April 9, 1968 G. MOESKER 3,376,635
METHOD OF PREPARING ELECTRODES FOR BONDING
TO A SEMICONDUCTIVE BODY
Filed Nov. 8, 1965 2 Sheets-Sheet 1

INVENTOR.
GERARD MOESKER
BY
AGENT

April 9, 1968 G. MOESKER 3,376,635

METHOD OF PREPARING ELECTRODES FOR BONDING TO A SEMICONDUCTIVE BODY

Filed Nov. 8, 1965 2 Sheets-Sheet 2

INVENTOR.
GERARD MOESKER

BY

Frank R. Trifari
AGENT 3,376,635

METHOD OF PREPARING ELECTRODES FOR BONDING TO A SEMICONDUCTIVE BODY

Gerard Moesker, Mollenhutseweg, Nijmegen, Netherlands, assignor to North American Philips Company, Inc., New York, N.Y., a corporation of Delaware Filed Nov. 8, 1965, Ser. No. 506,739
Claims priority, application Netherlands, Nov. 26, 1964, 64—1,724
5 Claims. (Cl. 29—471.1)

The invention relates to a method of manufacturing a semiconductor device. In particular, it relates to a method of connecting a wire between a contact zone or pad on the semiconductive wafer and an adjacent electrode, such as a lead-in pin or conductor. This wire is usually very thin, having a thickness of about 5–30 microns.

In a known method employed in the manufacture of high-frequency mesa transistors, very thin contact wires of gold or aluminum are required to be secured to closely neighboring metal contact areas, which may also be of gold or aluminum, alloyed in the surface of a semiconductor body or formed thereon by vapor deposition. The surface area of each contact zone and the spacing between the zones are particularly small, for example, $1000\mu^2$ and $25\mu$ respectively. It is therefore necessary to use microscopes for fastening the wires, which reduces the manufacturing rate.

In this known method, a contact wire is stretched between two pairs of chucks or pincers and orientated by means of a microscope with respect to the semiconductor device so that the two contact zones and the associated electrodes are just located beneath the wires. To this end, the semiconductor device may be orientated with respect to the stationary cross-hair lines of the microscope. By means of a number of fastening stylii movable along an accurately determined path with respect to said cross-hair lines, the wire is secured, preferably by thermocompression bonding, both to the two electrodes and to the contact zones between them. The disadvantage of this known method is that, afterwards, the portion of the fastened wire between the contact zones has to be removed to eliminate the short-circuit between them. The removal of the portion concerned of the fastened wire is time consuming and gives rise to difficulties; further, a microscope is necessary.

The invention has for its main object to provide a method in which said troublesome operations are reduced and in which the number of operations requiring the use of a microscope is reduced.

The method according to the invention is characterized in that a wire is stretched between two chuck-like members adapted to be moved away from each other and is severed into two portions at a point located between said members after preferably being weakened at said point by external action. Afterwards, at least one of the chuck-like members with a straight wire portion projecting over a given distance is orientated with respect to the semiconductor device which may have been previously located in a desired position, for example, by optical means, so that the severed end of the projecting straight wire portion is just located at the desired contact zone ready for bonding or fastening thereto. With this technique, it is possible to predict exactly where the wire will be broken and thus fix the location of the severed ends. Moreover, it was surprisingly found that prior to and after breaking the wire has an accurately straight shape. This permits of maneuvering the chuck-like member relative to the device to orient the wire, since the distance over which the wire portion projects from the chuck-like member is defined. It then becomes fairly easy to pass the end of a wire portion held in the chuck-like member to the contact zone; this lends itself to the mechanization of the manufacture of transistors of said type. In the method according to the invention, a microscope is therefore required only once for each wire connection, the position of the contact zones and of the electrodes of the semiconductor device being orientated with respect to stationary cross-hair lines of the microscope. It is therefore no longer necessary to orientate the end concerned of the wire portion with respect to a contact zone by means of a microscope.

The wire may be weakened where severing is desired by means of a notch in the transverse direction or in a different manner, for example by high-frequency heating or by electrical sparks. The wire is preferably weakened in the transverse direction after a tensile force has been exerted on it, and the wire is severed by moving the wire portions on either side of the weakened spot away from each other.

In a preferred embodiment of the method according to the invention, the chuck-like members are separated by a distance such that the distance between the resultant aligned severed wire portion ends corresponds with the desired distance between the wire portions in the position required on the semiconductor body, the proximal ends of the wire portions being then oriented with respect to the contact zones by moving the two chuck-like members in common with their held wire portion with respect to the semiconductor device, which had been previously arranged so that the contact zones and the electrodes are in their desired positions. This method permits of orientating simultaneously two wire portions by their respective ends above the two contact zones of a semiconductor device during manufacture.

If it is desired to fasten a straight contact wire at one end to a contact zone and at the other end to the associated electrode, it is advantageous to use a method which is characterized in that the wire, supplied from a supply reel, is held at its end by a clamping member, while at the area of the reel such a counter-moment is maintained that the wire is always kept straight. Thereafter, the wire is gripped by the chuck-like members at prescribed spots between the reel and the clamping member and is stretched, weakened and severed but only after the clamping member has released the wire. Next, the chuck-like members, each having a wire portion, are moved in the axial direction of the wire beyond the clamping member, the wire portion still connected with the reel being again gripped by the clamping member and severed. The two resultant wire portions of accurately defined shape and length and each held between a chuck-like member are then oriented with respect to the semiconductor device.

It will be further appreciated that the techniques described are applicable not only to mesa transistors, but also in the whole field of microelectronics and integrated circuits where connections employing thin wires are required between various contact zones or areas.

The invention will now be described more fully with reference to the accompanying diagrammatic drawings, in which.

Figures 1, 2, 3:
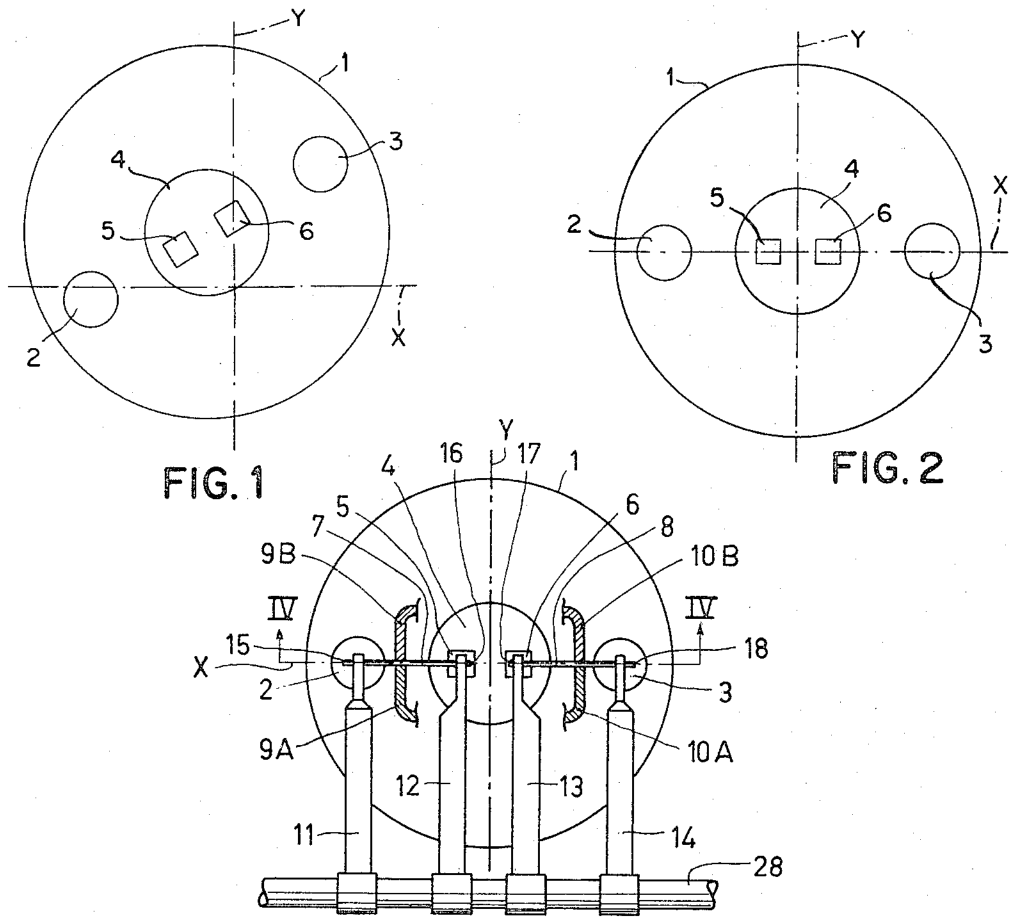
FIGS. 1 and 2 illustrate consecutive steps for orientating a semiconductor device to be provided with contact wires beneath the cross-hair system of a microscope.
FIGS. 3 and 4 show in a plan view and a cross-sectional view taken in the direction of the arrows IV—IV the method according to the invention for orientating thin contact wires of accurately defined length and shape with respect to the contact zones and the associated electrodes of a semiconductor device in the course of construction.
Figure 4:
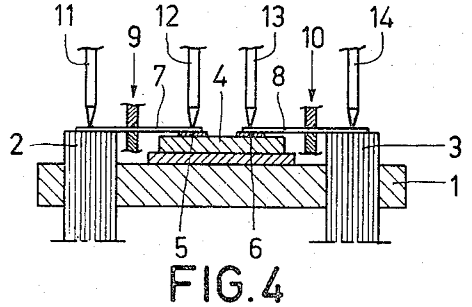

The semiconductor device in course of construction shown diagrammatically in FIGS. 1 to 4 comprises a base or header 1 having a number of relatively insulated electrodes or pins 2 and 3; reference numeral 4 designates a semiconductor wafer body, onto the surface of which metal contacts, here termed contact zones 5 and 6, are alloyed. Each of these contact zones has an upper surface of about $1000\mu^2$ and the free distance between these zones is about $25\mu$. This device has to be provided with metal contact wire portions 7 and 8 of gold or aluminum for connecting the electrode 2 to the contact zone 5 and the electrode 3 to the contact zone 6. For this purpose, pincer-like members or clamps 9 and 10 are provided in a manner to be described more fully hereinafter with wire portions 7 and 8 of prescribed length and shape, the ends 15, 16, 17 and 18 of which are orientated at a short distance above the electrodes 2, 3 and the contact zones 5, 6. The ends of the wire portions 7 and 8 are guided by the points of four simultaneously lowered fastening stylii 11 to 14 to touch the contact zones and the electrodes respectively and secured by well-known thermocompression bonding, the members 9 and 10 being subsequently removed. The thermocompression bonding itself is not essential to this invention and will therefore not be described more fully. The method is otherwise carried out as follows:

A semiconductor device in the course of construction, to be provided with contact wires (FIG. 1) is displaced and oriented relatively to a cross-hair system *x*, *y* of a microscope held in a fixed position so that the device is in the position shown in FIG. 2. The *x*-axis has to intersect the contact zones 5 and 6 and the electrodes 2 and 3 and the *y*-axis has to lie centrally between the zones 5 and 6. The fastening stylii 11–14 are arranged (FIG. 3) to perform an accurately defined movement relatively to the cross-hair system *x*, *y*. These stylii are connected to a common rotatable shaft 28. After the semiconductor device, is satisfactorily orientated with respect to the *x*- and *y*-axes, the points of the fastening stylii 11 to 14, adapted to rotate towards the device, will just touch the contact zones 5 and 6 and the electrodes 2 and 3. The chuck-like members 9 and 10 to be provided with wire portions 7 and 8 are also adapted to move so that at the minimum distance from the base 1 these members are always in an accurately defined position relative to the cross-hair system *x*, *y*.

The quite reproducible manner of arranging the wire portions 7 and 8 in the pincer-like members 9 and 10 for accurate orientation of the ends with respect to said members will be described with reference to FIGS. 5 to 9. In these figures, reference numeral 19 designates a supply reel having turns of contact wire of a thickness of, for example $9\mu$. With the aid of a blower 20, a force is exerted in the direction of the arrow 21 opposite the direction of unwinding, so that a substantially constant stress can be maintained in the wire 22 during unwinding. At a given distance from the reel 19 there is provided a clamping member or vise with movable jaws 23 and 24. Between this clamping member and the reel 19 the chuck members 9 and 10 can be operative as stretching members. The latter comprise jaws 9A, 9B, adapted to pivot on the parts 25 and 26, and the jaws 10A and 10B adapted to pivot on the sliding members 29 and 30. The latter are arranged on the parts 25 and 26 so as to be slidable in the direction of the double arrow 27. The distance over which these members are adapted to slide in common is defined by a stop 31 on the part 26.

Figures 5, 6, 7, 8, 9:
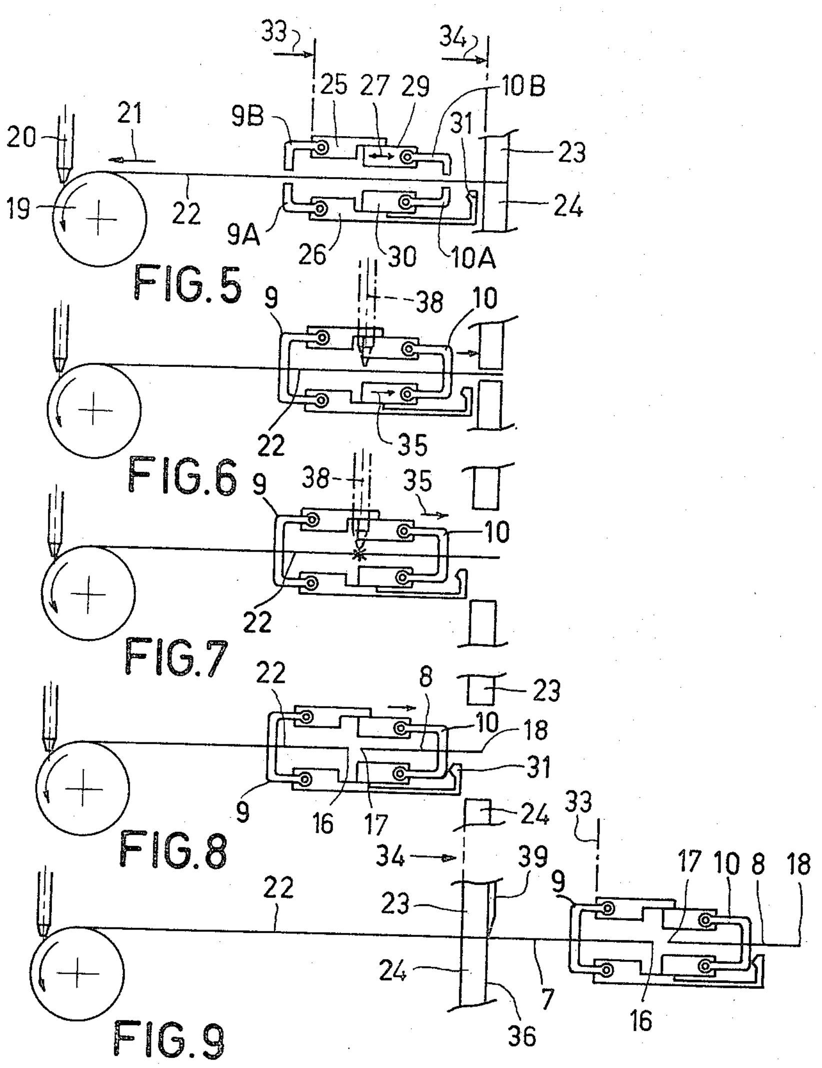
FIGS. 5 to 9 show a number of consecutive steps for forming and holding, in a reproducible manner, the thin wire portions in pincer-like stretching or chuck-like members.

First the members 9 and 10 are arranged at a minimum distance from each other at a place between the reel 19 and the jaws 23 and 24 so that a reference face 33 on the part 25 is spaced apart from a reference face 34 on the jaws 23, 24 by a predetermined distance. In this position, the jaws 9A and 9B, 10A and 10B (FIG. 5) are opened and the jaws 23, 24 are closed. The wire 22 is held in the stretched state in this position. Then the jaws 9A, 9B, 10A and 10B are closed and the jaws 23, 24 are opened (FIG. 6). Then the pincer-like member 10 is moved, preferably against spring pressure, to the right in the direction of the arrow 35 (FIG. 7), whereas the member 9 remains in its initial place. The wire 22 is thus stretched between the members 9 and 10, which operate as stretching members in this case. The wire thus having a certain amount of pre-stress is weakened in a transverse direction at a predetermined distance from the stationary reference face 33, for example by means of sparks from an electrode 38. The member 10 is then moved further to the right in the direction of the arrow 35, so that the wire 22 will break at the weakened spot. The member 10 is then moved towards the stop 31 (FIG. 8). It has been found that a predetermined distance between the proximal ends 16, 17 of the wire 22 and the wire portion 8 can be obtained in a reproducible manner and be maintained as long as the member 10 bears on the stop 31. The jaws 23 and 24 being opened, the members 9 and 10 are moved in the longitudinal direction of the wire 22 beyond the jaws 23 and 24 until the reference face 33 of the member 9 arrives at a predetermined distance from the reference face 34 of the jaws 23 and 24 (FIG. 9). In this position the wire 22 is severed by means of a cutter 39, after the jaws 23 and 24 have been closed. Thus, the second wire portion 7 is obtained. The ends 15, 16, 17 and 18 of the wires are thus orientated in a predetermined manner relatively to the members 9 and 10. The members 9 and 10 can then be moved along a predetermined path to just above the semiconductor device to occupy the position shown in FIGS. 3 and 4, the face 33 serving again as a reference face, but now with respect to the cross-hair system *x*, *y*.

While I have described my invention in connection with specific embodiments and applications, other modifications thereof will be readily apparent to those skilled in this art without departing from the spirit and scope of the invention as defined in the appended claims.

What is claimed is:

1. In the manufacture of a semiconductor device comprising a semiconductive body having at least one contact zone and an electrode associated with said contact zone, the method of connecting a thin wire to and between said contact zone and its associated electrode, comprising the steps of gripping spaced regions of a wire in spaced chuck-like members, separating the chuck-like members to stretch the wire, weakening said wire at a predetermined spot between said chuck-like members, severing the wire at said predetermined intermediate spot of the wire between the chuck-like members by further separating said chuck-like members, moving at least one chuck-like member over the semiconductive body and orienting the chuck-like member relative to the body such that the severed end of the wire overlies the contact zone, and thereafter bonding the severed wire end to the contact zone before releasing said severed wire from said chuck-like member and securing another portion of said severed wire to the associated electrode.

2. In the manufacture of a tiny semiconductor device comprising a semiconductive body having closely-spaced contact zones and electrodes associated with each contact zone all aligned in a row, the method of connecting a thin wire having a thickness of about 5–30 microns to and between each contact zone and its associated electrode, comprising the steps of locating the semiconductor device in a predetermined position, gripping spaced regions of a straight wire in spaced chuck-like members, separating the chuck-like members to stretch the wire, applying energy at a predetermined intermediate spot of the wire between the chuck-like members to weaken said wire and severing the stretched wire at said predetermined spot by further separating said chuck-like members, then separating the chuck-like members a predetermined distance apart, moving the chuck-like members holding the severed wire portions over the semiconductive device to orient the chuck-like members relative to the device such that the severed ends of the wires overlie the contact zones, and thereafter thermocompression bonding the severed wire ends to the contact zones and the opposite wire ends to the associated electrodes before releasing said wires from said chuck-like members.

3. The method of claim 2 wherein after the severing step the chuck-like members are separated by a predetermined distance substantially equal to the spacing between the contact zones.

4. The method of claim 2 wherein the semiconductor device is oriented such that the row formed by the contact zones and electrodes is parallel to the straight wire.

5. The method of claim 2 wherein the wire is clamped and supplied from a supply reel between the chuck-like members, the clamp is released when the chuck-like members grip the wire, the chuck-like members moved through the clamp after the severing step, and the wire severed from the supply reel after it is reclamped.

References Cited

UNITED STATES PATENTS

| | | | |
|---|---|---|---|
| 2,983,987 | 5/1961 | Shafer | 29—591 |
| 3,087,239 | 4/1963 | Clagett | 29—630 X |
| 3,133,459 | 5/1964 | Worden | 228—13 |
| 3,313,464 | 4/1967 | Avedissian | 228—13 X |

JOHN F. CAMPBELL, *Primary Examiner.*

J. CLINE, *Assistant Examiner.*

UNITED STATES PATENT OFFICE

CERTIFICATE OF CORRECTION

Patent No. 3,376,635 April 9, 1968

Gerard Moesker

It is certified that error appears in the above identified patent and that said Letters Patent are hereby corrected as shown below:

In the heading to the printed specification, line 9, "64-1,724" should read -- 64-13724 --.

Signed and sealed this 5th day of August 1969.

(SEAL)

Attest:

Edward M. Fletcher, Jr.

Attesting Officer

WILLIAM E. SCHUYLER, JR.

Commissioner of Patents